United States Patent
Formisano et al.

[15] 3,674,649
[45] July 4, 1972

[54] METHOD FOR THE PRODUCTION OF HUMIC ACIDS, HUMATES, AND OF COMPOSITIONS WHEREIN THEY ARE CONTAINED

[72] Inventors: Mario Formisano, Portici, (Napoli); Salvatore Coppola, Napoli, both of Italy

[73] Assignee: I.C.B.S.P.A. Industria Chimica e Biologica, Napoli, Italy

[22] Filed: May 19, 1969

[21] Appl. No.: 825,944

[30] Foreign Application Priority Data

May 18, 1968 Italy...................31329 A/68

[52] U.S. Cl. .................................. 195/104, 99/149, 71/9, 71/24
[51] Int. Cl. ........................................... C12b 1/00
[58] Field of Search ..................195/2, 36, 104, 138; 99/149; 71/8, 9, 24, 27, 14

[56] References Cited

UNITED STATES PATENTS

| | | | |
|---|---|---|---|
| 3,041,157 | 6/1962 | Crane et al | 71/9 |
| 3,138,448 | 6/1964 | Schulze | 71/9 |
| 3,142,557 | 7/1964 | McDuffie et al. | 71/9 |
| 3,235,369 | 2/1966 | Eweson | 71/9 |
| 3,398,186 | 8/1968 | Schwartz | 71/24 |

*Primary Examiner*—A. Louis Monacell
*Assistant Examiner*—Gary M. Nath
*Attorney*—McGlew and Toren

[57] ABSTRACT

Process for the preparation of humic acids and salts thereof by successive steps of fermentation of garbage and agricultural byproducts, under selected, controlled, temperature, time, and aeration conditions.

19 Claims, No Drawings

METHOD FOR THE PRODUCTION OF HUMIC ACIDS, HUMATES, AND OF COMPOSITIONS WHEREIN THEY ARE CONTAINED

This invention concerns a novel method for the preparation of humic acids and salts thereof, which products, when utilized either alone or in combination with other already known fertilizing salts, are highly useful in agriculture for the manuring of soil.

The many determinations of the elementary composition of humic acids have emphasized the fact that carbon is present in percentages higher than 50 percent, along with hydrogen (about 3.50 percent), oxygen (about 35 percent) and nitrogen (about 3 percent).

Nitrogen in particular, which in the past was considered to be an element only occasionally present in the humic acids, is now deemed to be, in the light of the most modern experimentation, an integral component of the molecule of humic acids, and about half thereof goes in solution, mainly under the form of aminoacids and amides.

Regarding functional groups which are present in the humic acid molecule, it is generally agreed, on the basis of the latest investigations, that three to four carboxyl groups, three to eight phenolic hydroxyl groups, as well as alcohol groups and methoxy groups are present therein. Moreover the possibility it cannot be excluded that a quinonic group (Dradunov), a carbonyl group (Tyurin) and a double bond (Milder) may also be present in the molecule of humic acid.

The distinctive bands of some functional groups, such as the OH, the aromatic C—H, the aliphatic C—H, the carbonylic C—H, the $C = O$, $C = C$ and $C = O$ of esters, quinone and phenols, and the C—O of ethers, have been recognized by Kumada in the infrared spectrum of humic acid. The crystallographic structure of humic acid salts has also been investigated, and the crystalline structure of humic-phosphatic compounds has been evidenced in contrast to the amorphous structure of humic acid utilized in the preparation of such compounds.

A further important property is also shown by the humic acids, i.e., owing to the presence of carboxyl and hydroxyl groups in the molecules thereof, they are able to take part in cation exchange phenomena and have exchange capacities which usually exceed 400 mol. eq./100 g. Thus, the hydrogen of the carboxil groups is substituted by metals in neutral or acid medium, while metals are substituted for the hydrogen of phenolic hydroxyl groups in alkaline medium.

Humic acids are naturally present in greater or lesser amounts in the humus of plough lands, and also in peats and green lignites.

The important and unbeatable function of humus in tillable lands is due to the presence of said active principles therein, to such principles being largely assigned the ability for exchange and absorption phenomena in the soil whereby, in point of fact, the humic acids represent, by their salts, a very efficient buffer system by which a remarkable contribution is afforded to the "buffer power" of soil.

Humic acids are produced in many countries, or to put it in a better way, in a few restricted zones thereof wherein a large supply of peats, lignites and similar materials are found, by extraction therefrom.

We have now surprisingly found that humic acids can be produced, with high yields and at industrially interesting costs, from garbage and agricultural byproducts.

The importance of such finding will be readily appreciated when considering that, while the importance of humic acids for tillable lands is well known, the production and application of such acids was heretofore restricted to a few zones only where, as already stated, an abundance of peats and lignites is available. Conversely, the possibility is now given to produce such acids in large amounts wherever a built-up area exists.

On the other hand, the method according to this invention solves a further problem which is becoming more and more worrisome and complex year after year.

As is already well known, due to progressive enlargement of towns, big amounts of refuse and garbage are collected each day, and the different systems adopted for the disposal thereof have proved themselves both expensive and unsatisfactory in one way or another.

Until recently, refuse and garbage were disposed of by dropping them into the sea or by discharge in waste lands relatively far from built-up areas, with or without being turned under the soil. The former of such solutions—apart from the fact that it is obviously restricted to built-up areas adjacent to sea coast—is to be avoided because the refuse is often pushed back to the shore by the winds and currents, thereby soiling the shore and possibly forming centers of infection. The latter solution is likewise unsatisfactory, due both to the increasing difficulty in finding suitable land as a consequence of the unceasing expansion and development of suburban zones, and to difficulties encountered in controlling and restricting the giving-off of stinks and the growing of insects and rodents.

Only recently incineration and the conversion into organic manure have been adopted to get rid of refuse and garbage.

However, the incineration method is very expensive and the mass of refuse is reduced only by 60 percent without leaving any utilizable product, while the conversion into an organic manure gives a bulky material requiring high conveyance costs from the point of production to the zone of utilization and which undergoes alterations and degradations in the long run; in addition, the resulting compost cannot find application in any of the modern fertilizing practices ( fertirrigation, hydroponic cultivations, "sugaring" of seeds, etc.)

The method according to this invention, synthesizing and extracting a high percentage of humic acids, i.e., highly valued organic fertilizers, out of refuse and garbage and thus to convert such initially septic materials into a sterile industrial product, much less bulky, easily conveyable and that allows an easy restoration of the humus, can be considered as a highly satisfactory and unforeseeable solution of the above stated problem, the more so when considering that by the method of the invention it is not necessary to remove from the garbage glass fragments, shell valves of molluscs, paper and cardboard as well as plastics, as required by other, already known transformation methods.

The residue which is left over after the extraction of humic acid is itself a good manure that can be utilized as a soil conditioner or can be mixed with the usual composts, particularly for cultivations requiring a sub-alkaline middle.

A brief description follows of the essential steps of the bio-technologic process for the production of humic acids or derivatives thereof according to this invention. The operational details are given in the examples which will be reported later on.

1. Charge

The garbage, having a moisture content ranging from 35 percent up to 65 percent—as such or integrated by the addition of suitable organic and/or mineral matters obtained as agricultural or industrial byproducts—is first separated from all metal bodies (which are recovered as a valuable material) by means of a magnetic separator, and then charged into a fermentator fitted with mechanisms by which a rotary motion can be imparted thereto and provided with rolling shutters or doors to allow for the required ventilation.

Such charge is made in the ratio of 350–500 kg of garbage per cubic meter of fermentator capacity.

2. Controlled primary fermentation

The exothermic fermentation, as caused by the epiphytic microflora which are naturally present in the mass of garbage, is controlled by the aeration and stirring of the whole mass at uniform and accurately pre-set time intervals in such a way as to have a progressive increase of the initial temperature of the mass not smaller than 10° C, up to 60° C or more, and then a progressive decrease of temperature, down to more or less the initial value.

Such coming back down to initial temperature can be obtained by local climatic conditions or by reverting to processes and activations comprising particular—occasional or not—biological and physical factors. The aeration and stirring operations can be discontinued only when the temperature stays for a few hours at values slightly higher than the initial ones. In the course of such controlled fermentation, there not only is ensured a disappearance of every vegetal or animal organism which might be pathogenic for men, animals and plants (owing to the occurence of a "Tindalisation" or fractioned sterilization process), but the chemical constituents of the mass are attacked and degraded by a successive and balanced action of physiologic microbic groups of anabolic and catabolic natures.

3. Controlled secondary fermentation

After the above primary fermentation, the whole material is sieved to remove the largest bodies and then suitably stored in such a manner as to prevent too large moisture losses and to restrict the aeration of the mass. In the course of said operations, the preliminary conditions are created for the awakening of activity of the by now selected microflora, whereby further exothermic fermentation occurs. The garbage heaps are then left standing under the above stated static conditions until no more temperature increases occur, or otherwise stated, until a temperature approximately equal to ambient temperature is steadily maintained.

4. Crushing of fermented mass

The fermented mass is crushed down to a content of at least 10 percent of fine powder, whereupon its moisture content is increased up to 40–50 percent. Now, an appreciable percentage—though much lower than that obtained at the end of the process—of humic acid is already present in the garbage mass.

5. Humification

The pH of the mass is adjusted to a value of 5 ± 0.5 by means of a diluted mineral acid whereby the total moisture content is simultaneously increased up to 60–70 percent.

The mass is inoculated with a massive culture of *Gliocladium catenulatum* and the incubation is carried out at a temperature of 35°–37° C for 2–4 days, leaving the surface of the mass uncovered and stirring at given time intervals to thereby promote the synthesis activities. The above stated microbic species can undergo, in a time within the afore specified limits, an intensive and macroscopic development without, however, having to sterilize the substrate. In the course of this operation, not only the more complex constituents of the substrate undergo a first, deeper attack, but the mass is enriched with fungi mycelium and with the products of the metabolism thereof, thus predisposing itself for the subsequent steps.

The pH is then adjusted to a value of 7.0±0.2, preferably by means of concentrated alkali (in order to prevent the moisture content from being excessively increased) while stirring, whereafter the mass is inoculated with a massive culture of *Streptomyces nigrifaciens*, and the incubation is carried out at a temperature in the range of 28°–30° C leaving the surface of the mass bare and stirring continuously, until the macroscopic development of aerobic mycelium is no more observed on the surface of a small sample of said mass stored under identical cultural conditions but without stirring.

The mass is now enriched with energetic products of metabolism of the *Azotobacter chroococcum* which, owing to its quick proliferation, will give rise to a further increase of humic constituents. Said germ is added as an intensive and massive culture, protracting the incubation at a temperature of 28°–30° C while stirring and leaving the surface bare, until industrially interesting increments in the humic acid content can be ascertained by the chemical analysis of samples taken out of the mass. Two or three days are usually required for such a purpose.

6. Extraction of humic acids

Repeated extraction with diluted alkali are made, while stirring, until the whole content of humic acids is recovered, whereafter the alkaline extract is filtered through non-adsorbing materials, preferably filter cloth.

7. Flocculation, collection and production of humic acid

The next step is carried out by adjusting the filtered solution to its isoelectric point by the addition of mineral acids at a suitable concentration and in a manner such that the colloidal mycelia thus formed are easily decantable. A portion of the mineral acid is bonded with the humic acids in a chemically stable form.

Finally, the flocculate is separated, washed and dried by means of any system and equipment suitable for the purpose.

The product thus obtained is stable and shows a very long shelf life. Thus it can be stored and utilized as such at any subsequent time as humic acid, or it can be converted into humate salts.

8. Preparation of humate salts

Either the powdered humic acids or directly the flocculated product obtained according to the preceding paragraph are dissolved in a solution containing the cation with which the salification is to be performed. The solution thus obtained can be concentrated or dried for the preparation of concentrated solutions, thick pastes or powders, as pure or technical products.

We have ascertained—and this is also covered by the invention—that the culture of *Gliocladium catenulatum*, as utilized for the first humification step, can be substituted by the hereinafter stated Eumycetes species which are also capable of a quick and intensive proliferation in the considered medium without any previous sterilization:

*Gliocladium roseum, Popularia sphaerospherma, Asperigillus fumigatus, Sordaria fimicola, Mortiorella vinacea, Penicillum glaucum, Asperigillus parasiticus, Asperigillus niger, Stisanus sp.*

The best results have been attained with cultures of *Mortiorella vinacea, Sordaria fimicola, Stisanus sp.* and *Aspergillus niger*. However, in anyone of these cases the yields have been sharply smaller than those obtained with the *Gliocladium catenulatum* HG/1 (pertaining to the collection of the Istituto di Microbiologia agraria e tecnica, University of Naples (I-MATUM)).

Even for the second humification step, experiments have been conducted by substituting the culture of *Streptomyces nigrifaciens* with other actinomycetic and strongly polyphenoloxydasic species, not antagonists of the *Azotobacter chroococcum*, also capable of proliferating in the medium in question. In particular, stocks have been tested pertaining to species, not wholly identified, of the collection of the Istituto di Micrologia agraria e tecnica (University of Naples), and pertaining to the series: *Antibioticus griseus, incarnatus, intermedius, rimosus, fradiae.*

A few stocks of the *Antibioticus griseus, incarnatus* and *rimosus* series have given yields only slightly smaller than those obtained with the *Streptomyces nigrificiens* HG/2 IMATUM, while sharply smaller yields have been obtained with all other stocks.

Moreover, increases in the yields of humic material may be obtained by adding massive microbic cultures, preferably capable of proliferating, or residues of other industrial microbiologic fermentations to the crushed material since the ensuing dead microbic mass usually results in an enrichment of humic compounds in the mass.

However, a maximum yield increment may be attained by the hereinafter itemized expedients: possible and suitable corrections and/or integrations of the mass can be made with mineral salts, as e.g., $K_2SO_4$, $MgSO_4$, $MnSO_4$, $Ca_3(PO_4)_2$ etc.; adding siliceous inorganic materials in the form of powders as "fixative" for the humic acids which will be produced in the course of successive conversions; the C/N ratio ( when higher than 20:1) is corrected by the addition of soluble nitrogen salts, as, e.g., $NH_4NO_3$, to better allow the implantation and the activity of humifying germs. As a general rule, the criterion to be followed is: should the contents of nutrients in the mass be slightly or not at all balanced, suitable integrations are to be made to cope with the nutrient requirements of the germs.

A more detailed description of the invention will now be given in the following non restrictive examples:

EXAMPLE 1

Mixed domestic and street garbage, freshly collected in the city of Portici (District of Naples), and having the following percent composition:

| | |
|---|---|
| Stones 35.00 | |
| masonry debris | 1.50 |
| Ashes and dust | 3.500 |
| Foodstuff residues | 42.20 |
| Shell valves of molluscs | 4.80 |
| Paper and cardboard | 7.00 |
| Metal materials | 2.50 |
| Bottles and glass fragments | 1.80 |
| Textiles | 0.90 |
| Wood | 0.30 |
| Rubber and plastics | 0.15 |
| Bones | 0.40 |
| Other refuse | 3.45 | and a moisture content averaging about 50 percent, was separated from metal bodies by means of electromagnets and then charged into a fermentator consisting of an octagonal iron drum fitted with staggered side doors and that was driven at 9 RPM by an electric motor.

The charge was made at the rate of 400 kg per cubic meter of fermentator volume, and the whole contents were stirred for through 30 minutes with closed doors. Then an alternation of motion (with closed doors) and of rest (with open doors) followed, six times a day, at 2-hour intervals, for 15 minutes each. The whole cycle was repeated through 4 consecutive days, in the course of which the hereinafter stated changes in the temperature were observed:

After 12 hrs the temperature was increased from the initial 14° C up to 21° C; at the beginning of the second day it was 46° C and decreased down to 38° C at the end of the same day; at the beginning of the third day, a temperature of 57° C was measured, which decreased down to 46° C at the end of the same day; at the beginning of the fourth day the mass temperature was 70° C, and at the end of the same day 57° C; finally, at the beginning of the fifth day the mass temperature was 23° C.

The mass was then discharged, sieved through a sieve with meshes of 16 sq.cm. and stored in a cylindric tower silo of masonry, apertured in such a manner as to allow a slight aeration and a restricted moisture loss (ratio of diameter to height of silo = 1.5:5 m). At this point a microbiological analysis was carried out on the material, to ascertain the possible presence of the following bacteria: *Mycobacterium tuberculosis, Cojnebacterium diphteriae Streptococcus pyogenes, Brucella abortus, Brucella melitensies, Salmonella typhi, Shigella dysenteriae, Treponema pallidum, Salmonella paratyphi, Entamoeba histolytica, Taenia saginata, Pasteurella typhimurium*, and it proved to be wholly free thereof.

Conversely, the same material appeared to be conspicuously rich (>$10^8$ cells per g) in the hereinafter stated physiological thermophile groups: actinomycetes, proteolytics, ammonisantes, cellulosolitic aerobes, amilolitics. There were very low contents of Eumycetes, both of mesophilic and thermophilic nature (never higher than 450 germs/g). The nitrogen fixators, nitrifying bacteria, pectinolitics and denitrifying bacteria were present in amounts higher, on the whole, than $10^7$ cells/g.

The temperature of the mass within the silo, which was at the start 20°–23° C, increased to 58° C after 5 days, then reduced gradually till the 15th day, at which time it appeared to be stabilized at the value of ambient temperature (18°–20° C).

The fermented mass withdrawn from the silo was crushed on a muller until a portion (15 percent) thereof was reduced into a fine powder, and in the course of the operation, diluted $H_2SO_4$ was added thereto in an amount such as to adjust the pH value to 5 and to increase the moisture content up to 70 percent.

Then the humification was carried out: the mass, charged into an open fermentator equipped with a stirrer driven at an adjustable speed, was inoculated with a massive culture of *Gliocladium catenulatum* HG/1 IMATUM (in a ratio of 1:10), grown on the same, non-sterilized substratum, by means of successive activating transplants, made always under identical conditions. The whole was incubated at 37° C with slow and intermittent stirring (5 minutes of stirring, repeated 10 times in the course of the first incubation day). The mycelium "-blanket" was already visible on the surface of the mass at the beginning of the second day, and therefore the stirring was performed at longer time intervals (one stirring each 6 hours). After 72 hrs of incubation, a thick superficial mycelium blanket appeared on the mass. The stirring was reduced to half an hour per day in order to have the mass properly homogenized; the pH value of the medium was adjusted to 7 by means of NaOH (30 percent) while rapidly stirring, and the mass was inoculated (in a 1:20 ratio) with a massive culture of *Streptomyces nigrifaciens* HG/2 IMATUN, grown on Baldacci's broth. The incubation was carried out at 30° C, keeping under control from the very beginning of said inoculation a portion of inoculated material, separated and contained in a static culture container (under the same temperature conditions).

The mass was continuously stirred, and the fermentation was discontinued when colonies of the Streptomyces appeared on the surface of the control sample. Then an inoculation was made (in the ratio of 1:100) with a thick culture of *Azotobacter chroococcum* HG/3 Imatum grown on a Greene's substratum; the incubation was made again at 30° C and with continuous stirring.

Chemical controls were made each day for the determination of the presence of humic acids according to Anne's technique (Annales Agromiques, 1945, 15, pages 161–172). The recoverable humates were: 10.5 percent after 1 day of incubation, 14 percent after 2 days of incubation and 14.3 percent after 3 days of incubation. Then the humification was discontinued and the extraction was carried out in a container fitted with a stirrer by means of a twofold treatment with NaOH N/10. In the first treatment, the humified material was extracted with 10 volumes of extracting solvent while the amount of solvent utilized in the second treatment was of five volumes only. Further extractions did not lead to the obtainment of additional amounts of product. Each extraction was protracted for about 12 hrs while slowly stirring.

The extract was filtered through a cloth and then acidified by the addition, while stirring, of $H_2SO_4$ 6N in order to cause the flocculation of humic acid. Such flocculation started at a pH value of 5.0; however, by the many experiments conducted, it appeared that the maximum yields can be attained by acidifying at a pH value of 1.5–2.0. The flocculated product was concentrated by decantation and collected by centrifugation.

For the preparation of sodium humate, the humic acid precipitate was washed in the same centrifuge, firstly with an 1 percent solution of sodium sulphate followed by a quick rinsing with water. The salification was carried out by a treatment with a 30 percent solution of NaOH, until attaining a pH value of 7. The obtained solution was spray dried and powdered. The analysis proved that the very fine, water soluble powder thus obtained did consist of very high concentrations of sodium humate.

The final yields were of about 14.0 percent of sodium humate, calculated on the material submitted to the extraction, and of about 9.8 percent calculated on the starting material.

A wholly similar process was adopted for the preparation of potassium humate, ammonium humate and calcium humate by salifying the flocculated humic acids with potassium hydroxide, ammonium hydroxide and calcium hydroxide respectively.

EXAMPLE 2

The procedure for the production of humic acids from a garbage having a composition as afore stated was repeated in the same manner as described in the preceding example.

However, in this run, the NaOH N/10 was replaced by $NH_4OH$ for the extraction of humic acids. In such case, when the flocculation of humic acids is performed, the supernatant liquid appears to be rich in $(NH_4)_2SO_4$ and in humic compounds non-flocculated under the working conditions. Therefore, the mother liquor can be considered as a starting material for the preparation of a mixed (organic and mineral) valuable fertilizer.

EXAMPLE 3

When the flocculation of humic acids present in the $NH_4OH$ extract is carried out with phosphoric acid, e.g., at a concentration of 85 percent, and the obtained flocculate is salified with a suitable mixture of KOH and $NH_4OH$ (according to required compositions), a product is obtained which contains, in addition to humic acids, also nitrogen, phosphorus and potassium, directly bonded to the humic acid molecule, thereby obtaining the always hoped for quaternary organic-mineral fertilizer.

EXAMPLE 4

A phospho-humic fertilizer was also prepared wherein all phosphorus is in a stable chemical form, movable through the soil and assimilable by the plants.

The humic acid, obtained by extraction with diluted alkali and precipitation with acids, was therefore treated with a monocalcium phosphate solution $Ca(H_2PO_4)_2$ and then with a solution of calcium hydroxide $Ca(OH)_2$, thereby obtaining an insoluble tricalcium phosphate on one hand and a suspension of colloidal calcium humate, containing $P_2O_5$, on the other hand.

All the above operations were accomplished very easily, and the yields were higher than those of the preceding example owing to higher atomic weight of the considered cations.

EXAMPLE 5

The same procedure of Example 1 was repeated; however the material was integrated, before the humification, with a mixture of mineral salts having the hereinafter stated composition:

| | |
|---|---|
| $NH_4NO_3$ | 200 g/100 kg of material to be humified |
| $Ca_3(PO_4)_2$ | 20 g/100 kg of material to be humified |
| $MgSO_4$ | 10 g/100 kg of material to be humified |
| $K_2SO_4$ | 20 g/100 kg of material to be humified |
| $MnSO_4$ | 1 g/100 kg of material to be humified |

A more intensive humification process occurred, with an increment of about 2.2 percent in the sodium humate yields.

EXAMPLE 6

The same procedure of example 1 was repeated on a material consisting of three parts of garbage having the composition stated in Example 1 and one part of agricultural by-products and to which the same mixture of mineral salts, as stated in Example 5, was added. In this latter case, an increment of 2 percent in the sodium humate yield was attained.

By doubling the $NH_4NO_3$ addition, the increase in the sodium humate yield was 3.4 percent.

EXAMPLE 7

The procedure of Example 1 was again repeated; however the material to be humified was integrated not only with the mixture of mineral salts as stated in Example 3 but also with 1 percent of powdered kaolin in one case, and with 1 percent of fossil flour in another case. The yields of sodium humate did increase by about 3 percent in the first case and by about 2.8 percent in the second case.

We claim:

1. A method for the production of high yields of highly concentrated humic acids from waste materials selected from the group consisting of garbage, town refuse, byproducts of agriculture, and residues of other industrial fermentations, alone or mixed with each other and separated only from ferromagnetic materials, wherein said waste material is successively submitted to treatment steps comprising:
   a. an exothermic primary fermentation, controlled in particular by alternate aeration and stirring of the waste material, in order to promote the growth of microorganisms in the range of natural epiphytic microflora naturally present in the waste material;
   b. an exothermic secondary fermentation, controlled by stirring and aeration in alternating cycles so that the temperature of the mass is about 20° C after about 2 weeks, thereby promoting the growth of said micro-organisms;
   c. treatment with dilute acid to a pH value of 5±0.5 and to a moisture content of 60–70 percent, followed by a fermentation with a massive culture of Gliocladium catenulatum at a temperature of 35°–37° C;
   d. treatment with concentrated alkali to a pH value of 7.0±0.2 and fermentation with a massive culture of *Streptomyces nigrifaciens* at a temperature of 28°–30° C;
   e. fermentation with a massive culture of Azotobacter chroococcum at a temperature of 28°–30° C;
   f. extraction of humic acids from the thus treated waste material by means of dilute alkali; and
   g. flocculation of humic acids from the alkaline solution by the addition thereto of an acid up to the isoelectric point and filtering.

2. A method according to claim 1, wherein the step (a) of exothermic fermentation is discontinued when the temperature is reduced down to its initial value.

3. A method according to claim 1, wherein the material is integrated, before being submitted to fermentation step (c), with the required mixture of mineral salts, selected from those which represent energetic and plastic substances for the growth of germs useful for the method.

4. A method according to claim 1, wherein mineral or organic substances, capable of stimulating the growth and metabolism of germs useful for the method, are added to the material, before it is submitted to fermentation step (c).

5. A method according to claim 1, wherein a quantity in the range of 1–5 percent of siliceous materials is added to material that is being processed, before it is submitted to fermentation step (c).

6. A method according to claim 1 wherein the waste material is crushed until it contains not less than 10 percent of fine powder before being submitted to fermentation step (c).

7. A method according to claim 6 wherein the moisture contents is increased, simultaneously with the crushing operation, up to 40–50 percent.

8. A method according to claim 1 wherein the dilute acid in fermentation step (c) is dilute $H_2SO_4$.

9. A method according to claim 1, wherein a 30 percent solution of NaOH is utilized as concentrated alkali in the fermentation step (d).

10. A method according to claim 1, wherein the extraction step (f) is carried out with alkali having a normality in the range of N/5 and N/15.

11. A method according to claim 1 wherein extraction step (f) is carried out with an aqueous solution of middle concentration of an alkali salt of a weak organic acid.

12. A method as claimed in claim 1, wherein after the filtering of step (g) the humic acids are salified.

13. A method according to claim 12 wherein the salifying of humic acids is carried out with a hydroxide selected from the group consisting of potassium hydroxide, ammonium hydroxide, and calcium hydroxide.

14. A method according to claim 13, wherein the salifying may be carried out with alkali of those oligoelements which are essential to the physiology of plants, in view of their growing and of their destination for the human alimentation or livestock feeding, or even for pharmaceutical or phytotherapic applications.

15. A method according to claim 1, wherein the flocculation step (g) is carried out with organic or inorganic acids, down to a pH value in the range of 5–1.

16. A method according to claim 1 wherein a portion of the organic or inorganic acid used in flocculation step (g) at pH values in the range of 5–1 is bonded in a chemically stable form with a humic acids.

17. A method according to claim 16, wherein organic or inorganic acids, capable of increasing the fertilizing efficiency of the final products, or to develop a synergic action therewith, are utilized for the flocculation of humic acids.

18. A method for the production of high yields of highly concentrated humic acids from waste materials selected from the group consisting of garbage, town refuse, byproducts of agriculture, and residues of other industrial fermentations, alone or mixed with each other and separated only from ferromagnetic materials, wherein said waste material is successively submitted to treatment steps comprising:
   a. an exothermic primary fermentation, controlled in particular by alternate aeration and stirring of the waste material, in order to promote the growth of micro-organisms in the range of natural epiphytic microflora naturally present in the waste material;
   b. an exothermic secondary fermentation, controlled by stirring and aeration in alternating cycles so that the temperature of the mass is about 20° C after about 2 weeks, thereby promoting the growth of said micro-organisms;
   c. treatment with dilute acid to a pH value of 5±0.5 and to a moisture content of 60–70 percent, followed by a fermentation with a massive culture of an eumycetic species selected from the group consisting of *Gliocladium roseum*, *Popularia sphaerospherma*, *Aspergillus fumigatus*, *Sordaria fimicola*, *Mortiorella vinacea*, *Penicillium glacum*, *Aspergillus parasiticus*, *Aspergillus niger* and Stisanus sp. at a temperature of 35°–37° C;
   d. treatment with concentrated alkali to a pH value of 7.0±0.2 and fermentation with a massive culture of *Streptomyces nigrifaciens* at a temperature of 28°–30° C;
   e. fermentation with a massive culture of *Azotobacter chroococcum* at a temperature of 28°–30° C;
   f. extraction of humic acids from the thus treated waste material by means of dilute alkali; and
   g. flocculation of humic acids from the alkaline solution by the addition thereto of an acid up to the isoelectric point and filtering.

19. A method for the production of high yields of highly concentrated humic acids from waste materials selected from the group consisting of garbage, town refuse, byproducts of agriculture, and residues of other industrial fermentations, alone or mixed with each other and separated only from ferromagnetic materials, wherein said waste material is successively submitted to treatment steps comprising:
   a. an exothermic primary fermentation, controlled in particular by alternate aeration and stirring of the waste material, in order to promote the growth of micro-organisms in the range of natural epiphytic microflora naturally present in the waste material;
   b. an exothermic secondary fermentation, controlled by stirring and aeration in alternating cycles so that the temperature of the mass is about 20° C after about 2 weeks, thereby promoting the growth of said micro-organisms;
   c. treatment with dilute acid to a pH value of 5±0.5 and to a moisture content of 60–70 percent, followed by a fermentation with a massive culture of *Gliocladium catenulatum* at a temperature of 35°–37° C;
   d. treatment with concentrated alkali to a pH value of 7.0±0.2 and fermentation with a massive culture of an actinomycetic, polyphenoloxydasic species, non-antagonistic of the *Azotobacter chroococcum* at a temperature of 28°–30° C;
   e. fermentation with a massive culture of *Azotobacter chroococcum at a temperature of* 28°–30° C;
   f. extraction of humic acids from the thus treated waste material by means of dilute alkali; and
   g. flocculation of humic acids from the alkaline solution by the addition thereto of an acid up to the isoelectric point and filtering.

\* \* \* \* \*